United States Patent
Araki et al.

(10) Patent No.: US 9,546,238 B2
(45) Date of Patent: Jan. 17, 2017

(54) METHOD FOR PRODUCING HYDROGENATED CONJUGATED DIENE COPOLYMER

(75) Inventors: Yoshifumi Araki, Chiyoda-ku (JP); Eiji Sasaya, Chiyoda-ku (JP); Kenta Shibuya, Chiyoda-ku (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 21 days.

(21) Appl. No.: 14/122,144

(22) PCT Filed: May 11, 2012

(86) PCT No.: PCT/JP2012/062137
§ 371 (c)(1),
(2), (4) Date: Jan. 13, 2014

(87) PCT Pub. No.: WO2012/165120
PCT Pub. Date: Dec. 6, 2012

(65) Prior Publication Data
US 2014/0121329 A1    May 1, 2014

(30) Foreign Application Priority Data
May 27, 2011   (JP) .................................. 2011-119647

(51) Int. Cl.
*C08F 236/10* (2006.01)
*C08C 19/02* (2006.01)
*C08F 212/08* (2006.01)

(52) U.S. Cl.
CPC .............. *C08F 236/10* (2013.01); *C08C 19/02* (2013.01); *C08F 212/08* (2013.01)

(58) Field of Classification Search
None
See application file for complete search history.

(56) References Cited

U.S. PATENT DOCUMENTS

| | | | |
|---|---|---|---|
| 3,281,383 A | 10/1966 | Zelinski et al. | |
| 4,603,155 A | 7/1986 | Muramori et al. | |
| 5,620,939 A | 4/1997 | Halasa et al. | |
| 5,677,402 A * | 10/1997 | Halasa et al. ................. | 526/174 |
| 6,433,102 B1 | 8/2002 | Suzuki et al. | |
| 6,455,635 B1 | 9/2002 | Yonezawa et al. | |
| 2006/0106150 A1* | 5/2006 | Tadaki et al. ................. | 524/493 |
| 2006/0122343 A1 | 6/2006 | Koch et al. | |
| 2008/0161485 A1 | 7/2008 | Suzuki et al. | |
| 2009/0082534 A1 | 3/2009 | Cabioch et al. | |
| 2009/0312449 A1* | 12/2009 | Sasaki et al. ................. | 521/148 |
| 2010/0016508 A1 | 1/2010 | Sasagawa et al. | |

FOREIGN PATENT DOCUMENTS

| | | |
|---|---|---|
| CN | 101384631 A | 3/2009 |
| EP | 1985641 A1 | 10/2008 |
| JP | S36-019286 B | 10/1961 |
| JP | S43-017979 B | 7/1968 |
| JP | S46-032415 B | 9/1971 |
| JP | S48-002423 B | 1/1973 |
| JP | S48-004106 B | 2/1973 |
| JP | S49-036957 B1 | 10/1974 |
| JP | S56-028925 B | 7/1981 |
| JP | S59-166518 A | 9/1984 |
| JP | S60-186577 A | 9/1985 |
| JP | H06-049111 A | 2/1994 |
| JP | H08-109219 A | 4/1996 |
| JP | H09-132609 A | 5/1997 |
| JP | 2000-053706 A | 2/2000 |
| JP | 2000-169521 A | 6/2000 |
| JP | 2001-240636 A | 9/2001 |
| JP | 2005-513172 A | 5/2005 |
| JP | 2006-500435 A | 1/2006 |
| JP | 2006-152277 A | 6/2006 |
| JP | 2006-241289 A | 9/2006 |
| JP | 2010-143960 A | 7/2010 |
| KR | 10-2009-0031933 A | 3/2009 |
| TW | 200636004 A | 10/2006 |
| TW | 201020289 A | 6/2010 |
| WO | 00/15681 A1 | 3/2000 |
| WO | 2008/020476 A1 | 2/2008 |

OTHER PUBLICATIONS

International Search Report issued in corresponding International Patent Application No. PCT/JP2012/062137 Aug. 7, 2012.

* cited by examiner

*Primary Examiner* — Robert C Boyle
(74) *Attorney, Agent, or Firm* — Morgan, Lewis & Bockius LLP

(57) ABSTRACT

The present invention relates to a method for producing a hydrogenated conjugated diene copolymer including a polymerization step and a hydrogenation step, wherein in the polymerization step, a conjugated diene copolymer having a high vinyl bond amount of a conjugated diene block moiety and a narrow molecular weight distribution can be produced, and in the hydrogenation step, the rate of hydrogenation is high and productivity is excellent.

11 Claims, No Drawings

METHOD FOR PRODUCING HYDROGENATED CONJUGATED DIENE COPOLYMER

TECHNICAL FIELD

The present invention relates to a method for producing a hydrogenated conjugated diene copolymer.

BACKGROUND ART

Styrenic block copolymers of conjugated diene monomers and vinyl aromatic monomers have been widely used in the fields of footwear, plastic modifiers, asphalt modifiers, adhesives, and the like, and as packaging materials for home products, household appliances and industrial components, and the like, toys and the like because even when the styrenic block copolymers are not vulcanized, the copolymers have the same elasticity as vulcanized natural rubber and synthetic rubber at room temperature and also have the same excellent processability as thermoplastic resins at high temperatures.

Further, a hydrogenated product of the styrenic block copolymer is widely put in practical use as automobile parts, medical devices, and the like in addition to the application fields as described above because it is excellent in weather resistance and heat resistance.

In particular, since a hydrogenated styrenic copolymer including a conjugated diene moiety having a high vinyl bond amount has high compatibility with polypropylene, it is used as a modifier of polypropylene, and compositions thereof are used for various applications.

For example, Patent Document 1 discloses a composition of a hydrogenated block copolymer and a polypropylene resin, the hydrogenated block copolymer being prepared by hydrogenating a copolymer having a block of vinyl aromatic hydrocarbon and a block of a diene moiety having a vinyl bond amount of 62% or more.

However, in order to prepare a conjugated diene moiety having a high vinyl bond amount like the block copolymer described in Patent Document 1, the step of polymerization at a low temperature for a long time is generally required, which has a problem of low productivity.

In order to solve the problem of polymerization time for achieving such a high vinyl bond amount, Patent Document 2 proposes a method for producing an unhydrogenated copolymer in which a dialkyl ether and an alkali organic compound are used in a polymerization step and a molar ratio of the alkali organic compound to an organolithium compound is set to 0.5 mol or more.

Further, Patent Document 3 proposes a method for producing an unhydrogenated copolymer in which a polarity regulator, Na alkoxide, and an organolithium compound are used in a polymerization step and a molar ratio of the Na alkoxide to the polarity regulator is set in a range of from 0.1 to 10 and a molar ratio of the Na alkoxide to the organolithium compound is set in a range of from 0.1 to 10.

Furthermore, Patent Document 4 proposes a method for producing an unhydrogenated copolymer in which a polar agent, a metal salt, and an organolithium compound are used in a polymerization step and a molar ratio of the polar agent to the organolithium compound is set to 3 or more, a molar ratio of the metal salt to the organolithium compound in a range of from 0.01 to 2, and a molar ratio of the metal salt to the polar agent in a range of from 0.001 to 0.5.

On the other hand, improvement in the rate of hydrogenation is a major problem for obtaining a hydrogenated copolymer in terms of economical efficiency.

In view of such a problem, Patent Document 5 proposes a method for producing a hydrogenated copolymer in which a tertiary amine compound and sodium alkoxide are allowed to be present together in a polymerization step, thereby improving the rate of a subsequent hydrogenation step.

LIST OF PRIOR ART DOCUMENTS

Patent Documents

Patent Document 1: International Publication No. WO00/15681
Patent Document 2: National Publication of International Patent Application No. 2006-500435
Patent Document 3: Japanese Patent Laid-Open No. 09-132609
Patent Document 4: National Publication of International Patent Application No. 2005-513172
Patent Document 5: International Publication No. WO2008/020476

SUMMARY OF INVENTION

Problems to be Solved by the Invention

However, all of the conventionally proposed production methods as described above still have a room to be improved.

Therefore, an object of the present invention is to provide a method for producing a hydrogenated conjugated diene copolymer, wherein a copolymer can be produced by polymerization of a conjugated diene monomer and a vinyl aromatic monomer, the obtained copolymer having a conjugated diene block moiety having a high vinyl bond amount and a narrow molecular weight distribution, and wherein the rate of hydrogenation in a hydrogenation step after the polymerization step is high and the productivity is also excellent.

Means for Solving the Problems

As a result of intensive studies for solving the problems of the prior art as described above, the present inventors have found that the above problems can be solved at a time by using a polymerization initiator, a specific ether compound, and an alkali metal alkoxide in a polymerization step and specifying the molar ratios thereof, and the finding has led to the completion of the present invention.

Specifically, the present invention is as follows.

[1]

A method for producing a hydrogenated conjugated diene copolymer comprising:

a polymerization step of copolymerizing a conjugated diene monomer and a vinyl aromatic monomer using an initiator comprising an organolithium compound; and a hydrogenation step of hydrogenating the conjugated diene copolymer obtained in the polymerization step, wherein in the polymerization step, the organolithium compound, an ether compound (A) having two or more oxygen atoms, and an alkali metal alkoxide (B) are allowed to be present together in the following molar ratios:

(A)/organolithium compound is 0.2 or more and less than 3.0; and (B)/organolithium compound is 0.01 or more and 0.3 or less.

[2]

The method for producing the hydrogenated conjugated diene copolymer according to the above item [1], wherein in the polymerization step, a molar ratio of the alkali metal alkoxide (B) to the ether compound (A) having two or more oxygen atoms is 0.01 or more and 0.1 or less.

[3]

The method for producing the hydrogenated conjugated diene copolymer according to the above item [1] or [2], wherein the ether compound (A) having two or more oxygen atoms is glycol dialkyl ether or 2,2-bis(2-oxolanyl)propane.

[4]

The method for producing the hydrogenated conjugated diene copolymer according to any one of the above items [1] to [3], wherein an alkali metal of the alkali metal alkoxide (B) is sodium or potassium.

[5]

The method for producing the hydrogenated conjugated diene copolymer according to any one of the above items [1] to [4], wherein in the hydrogenation step, a titanocene compound is used as a hydrogenation catalyst.

Advantageous Effects of Invention

The present invention can provide a method for producing a hydrogenated conjugated diene copolymer including a polymerization step of a conjugated diene monomer and a vinyl aromatic monomer and a hydrogenation step, wherein in the polymerization step, a conjugated diene copolymer having a high vinyl bond amount of a conjugated diene block moiety and a narrow molecular weight distribution can be produced, and the rate of hydrogenation in the hydrogenation step after the polymerization step is high and productivity is excellent.

MODE FOR CARRYING OUT THE INVENTION

Hereinafter, the embodiments of the present invention (hereinafter referred to as "the present embodiments") will be described in detail.

Note that the present invention is not limited to the following embodiments and can be carried out by variously modifying them within the scope of the gist of the present invention.

[Method for Producing Hydrogenated Conjugated Diene Copolymer]

A method for producing a hydrogenated conjugated diene copolymer according to the present embodiments comprises:

a polymerization step of copolymerizing a conjugated diene monomer and a vinyl aromatic monomer with an initiator comprising an organolithium compound; and a hydrogenation step of hydrogenating the conjugated diene copolymer obtained in the polymerization step, wherein in the polymerization step, the organolithium compound, an ether compound (A) having two or more oxygen atoms, and an alkali metal alkoxide (B) are allowed to be present together in the following molar ratios:

(A)/organolithium compound is 0.2 or more and less than 3.0; and (B)/organolithium compound is 0.01 or more and 0.3 or less.

(Polymerization Step)

In the polymerization step, a conjugated diene monomer and a vinyl aromatic monomer are copolymerized using an initiator comprising an organolithium compound using a predetermined solvent.

Examples of the polymerization method include methods described in Japanese Patent Publication No. 36-19286, Japanese Patent Publication No. 43-17979, Japanese Patent Publication No. 46-32415, Japanese Patent Publication No. 49-36957, Japanese Patent Publication No. 48-2423, Japanese Patent Publication No. 48-4106, Japanese Patent Publication No. 56-28925, Japanese Patent Laid-Open No. 59-166518, and Japanese Patent Laid-Open No. 60-186577.

<Conjugated Diene Monomer>

Examples of the conjugated diene monomer include, but are not limited to, conventionally known materials such as 1,3-butadiene, isoprene, 2,3-dimethyl-1,3-butadiene, 1,3-pentadiene, 3-methyl-1,3-pentadiene, 1,3-heptadiene, and 1,3-hexadiene. These may be used alone or in combination of two or more. Among these, 1,3-butadiene and isoprene are preferred.

<Vinyl Aromatic Monomer>

Examples of the vinyl aromatic monomer include, but are not limited to, conventionally known materials such as styrene, α-methylstyrene, p-methylstyrene, vinylethylbenzene, 2-vinylnaphthalene, divinylbenzene, and diphenylethylene. These may be used alone or in combination of two or more. Among these, styrene is preferred.

<Solvent>

Examples of the solvent used for producing the conjugated diene copolymer include, but are not limited to, conventionally known materials such as aliphatic hydrocarbons such as butane, pentane, hexane, isopentane, heptane, octane, and isooctane; alicyclic hydrocarbons such as cyclopentane, methylcyclopentane, cyclohexane, methylcyclohexane, and ethylcyclohexane; aromatic hydrocarbons such as benzene, toluene, ethylbenzene, and xylene; and various hydrocarbon solvents. These may be used alone or in combination of two or more.

<Initiator Comprising Organolithium Compound>

The initiator comprising an organolithium compound (hereinafter may be referred to as an organolithium compound or an organo-Li compound) is a compound in which one or more lithium atoms are bound in a molecule, and examples thereof include, but are not limited to, ethyllithium, n-propyllithium, isopropyllithium, n-butyllithium, sec-butyllithium, tert-butyllithium, hexamethylene lithium, butadienyldilithium, and isoprenyldilithium. These may be used alone or in combination of two or more.

Further, the organolithium compound may be dividedly added two or more times during the polymerization of the conjugated diene copolymer.

<Polymerization Temperature, Time, Atmosphere, Pressure>

The polymerization temperature for producing the conjugated diene copolymer is preferably −10 to 150° C., more preferably 30 to 120° C.

The time required for polymerization changes depending on conditions, but is preferably within 48 hours, more preferably within 10 hours.

The atmosphere of the polymerization system is preferably an inert gas atmosphere such as nitrogen gas.

The polymerization pressure may be, but is not particularly limited to, within a pressure range sufficient to maintain the monomer and solvent in a liquid phase within the above polymerization temperature range.

Further, it is preferred that impurities such as water, oxygen, and carbon dioxide which inactivate the catalyst and living polymer be not incorporated into the polymerization system.

<Ether Compound (A) Having Two or More Oxygen Atoms>

In the present embodiments, an ether compound (A) having two or more oxygen atoms (hereinafter may be referred to only as (A)) and an alkali metal alkoxide (B) (hereinafter may be referred to only as (B)) to be described below are used in the polymerization step of the conjugated diene copolymer.

Examples of the ether compound (A) having two or more oxygen atoms include, but are not limited to, 2,2-diethoxypropane, 1,2-diethoxypropane, dioxane, ethylene glycol dimethyl ether, ethylene glycol diethyl ether, diethylene glycol dimethyl ether, diethylene glycol diethyl ether, ethyl ethylene glycol t-butyl ether, ethyl ethylene glycol butyl ether, dimethoxybenzene, triethylene glycol dimethyl ether, 1,2,3-trialkoxybenzene, 1,2,4-trialkoxybenzene, and oxolanyl alkanes such as bis(2-oxolanyl)ethane, 2,2-bis(2-oxolanyl)propane, 1,1-bis(2-oxolanyl)ethane, 2,2-bis(2-oxolanyl)butane, 2,2-bis(5-methyl-2-oxolanyl)propane, and 2,2-bis(3,4,5-trimethyl-2-oxolanyl)propane.

These may be used alone or in combination of two or more.

An ether compound (A) having two oxygen atoms is preferred as the ether compound (A) having two or more oxygen atoms.

In particular, glycol dialkyl ether or 2,2-bis(2-oxolanyl)propane is more preferred. Further, among them, a structure showing symmetry in the molecule is preferred, and in the case of glycol dialkyl ethers, those in which two alkyl species in the molecule are the same are preferred.

2,2-Bis(2-oxolanyl)propane and ethylene glycol dialkyl ether are further more preferred.

<Alkali Metal Alkoxide (B)>

The alkali metal alkoxide (B) used in the polymerization step for producing the conjugated diene copolymer is a compound represented by the general formula MOR (wherein M is an alkali metal, and R is an alkyl group).

As an alkali metal of the alkali metal alkoxide (B), sodium or potassium is preferred in terms of a high vinyl bond amount, narrow molecular weight distribution, and a high rate of polymerization.

The alkali metal alkoxide (B) is, but not limited to, preferably a sodium alkoxide, a lithium alkoxide, and a potassium alkoxide each having an alkyl group having 2 to 12 carbon atoms, more preferably a sodium alkoxide and a potassium alkoxide each having an alkyl group of having 3 to 6 carbon atoms, further preferably sodium t-butoxide, sodium t-pentoxide, potassium t-butoxide, and potassium t-pentoxide. Among them, sodium t-butoxide and sodium t-pentoxide which are sodium alkoxides are further more preferred.

In the present embodiments, an initiator comprising an organolithium compound, the ether compound (A) having two or more oxygen atoms, and the alkali metal alkoxide (B) are allowed to be present together in the following molar ratios in the polymerization step of a conjugated diene monomer and a vinyl aromatic monomer.

Specifically, the molar ratio of the ether compound (A) having two or more oxygen atoms to the organolithium compound is set to 0.2 or more and less than 3.0, and the molar ratio of the alkali metal alkoxide (B) to the organolithium compound is set to 0.01 or more and 0.3 or less.

The molar ratio of the (A)/organolithium compound is set to 0.2 or more in terms of increasing the vinyl bond amount and the rate of polymerization, and set to less than 3.0 in terms of obtaining narrow molecular weight distribution and high hydrogenation activity.

Further, the molar ratio of the (B)/organolithium compound is set to 0.01 or more in terms of increasing the vinyl bond amount and the rate of polymerization, and set to 3.0 or less in terms of obtaining narrow molecular weight distribution and high hydrogenation activity.

Thus, improvement in the rate of polymerization is achieved; the vinyl bond amount in the conjugated diene block moiety of a target conjugated diene copolymer can be increased; the molecular weight distribution can be narrowed; and improvement in the rate of hydrogenation in the hydrogenation step to be described below is achieved.

The molar ratio of the ether compound (A) having two or more oxygen atoms to the organolithium compound in the polymerization step is preferably 1.0 or more in terms of a high vinyl bond amount and a high rate of polymerization, and preferably 2.5 or less in terms of narrow molecular weight distribution and high hydrogenation activity, and is more preferably in the range of 1.5 or more and 2.0 or less.

Further, the molar ratio of the alkali metal alkoxide (B) to the organolithium compound is preferably 0.02 or more in terms of a high vinyl bond amount and a high rate of polymerization and preferably 0.2 or less in terms of narrow molecular weight distribution and high hydrogenation activity, and is more preferably 0.03 or more and 0.1 or less, further preferably 0.03 or more and 0.08 or less.

Furthermore, the molar ratio of the alkali metal alkoxide (B) to the ether compound (A) having two or more oxygen atoms is 0.01 or more in terms of a high vinyl bond amount and a high rate of polymerization and preferably 0.1 or less in terms of achieving narrow molecular weight distribution and obtaining high hydrogenation activity, and is more preferably 0.015 or more and 0.09 or less, further preferably 0.02 or more and 0.09 or less, and further more preferably 0.025 or more and 0.08 or less.

<Block Structure of Conjugated Diene Copolymer>

The polymerization step as described above is suitable as a method for producing a block copolymer comprising a block mainly composed of a vinyl aromatic monomer and a block mainly composed of a hydrogenated conjugated diene monomer unit.

The structure of conjugated diene block copolymer is represented, for example, by the following formula (1) to formula (6).

$$(a-b)_n \qquad (1)$$

$$b-(a-b)_n \qquad (2)$$

$$a-(b-a)_n \qquad (3)$$

$$a-(b-a)_n-X \qquad (4)$$

$$[(a-b)_k]_m-X \qquad (5)$$

$$[(a-b)_k-a]_m-X \qquad (6)$$

In the above formula (1) to formula (6), a represents a block mainly composed of a vinyl aromatic monomer unit; and b represents a block mainly composed of a conjugated diene monomer unit.

When a plurality of polymer blocks a and b are present in a conjugated diene block copolymer, a structure such as molecular weight and composition of each block may be the same or different.

In the present specification, the term "mainly composed of" means that the monomer unit is contained in an amount of 60% by mass or more in the block, and the monomer unit is preferably contained in an amount of 80% by mass or more, more preferably 90% by mass or more, and further preferably 95% by mass or more.

In the above formula (1) to formula (6), X represents, for example, a residue of coupling agents such as tetrachlorosilane, tin tetrachloride, epoxidized soybean oil, a polyhalogenated hydrocarbon compound, a carboxylate compound, a polyvinyl compound, a bisphenol type epoxy compound, an alkoxy silane compound, a halogenated silane compound, and an ester compound, or a residue of initiators such as a polyfunctional organolithium compound; and m, n, and k represent an integer of 1 or more, and are preferably an integer of 1 to 5.

The boundary or the endmost part of each block constituting the conjugated diene block copolymer does not necessarily need to be clearly distinguished.

Further, the distribution of the vinyl aromatic monomer unit in each polymer block is not limited when it is within the range of the content of the vinyl aromatic compound, and may be uniformly distributed or may be distributed in a tapered shape, a step shape, a convex shape, or a concave shape. Further, a crystal part may be present in the polymer block. In each polymer block, a plurality of segments each having a different content of vinyl aromatic compound may be present together.

Examples of the methods of giving variation to the distribution of the vinyl unit in the conjugated diene moiety constituting the conjugated diene copolymer before being subjected to hydrogenation to be described below include a method of adding a vinylation agent in the polymerization step and a method of changing the temperature in the polymerization step.

The hydrogenated conjugated diene copolymer obtained by the production method of the present embodiments is suitable for the modification of propylene, and when polypropylene is used in the preparation of a composition, a hydrogenated conjugated diene copolymer is preferred in which the average vinyl bond amount in the conjugated diene monomer unit of the conjugated diene copolymer before the hydrogenation step is 62 mol % or more, in terms of ensuring high compatibility with the polypropylene. The average vinyl bond amount is preferably 69 mol % or more, more preferably 72 mol % or more.

Further, in terms of productivity, it is preferably 95 mol % or less, more preferably 90 mol % or less, further preferably 85 mol % or less.

The content of the polymer block mainly composed of the vinyl aromatic monomer unit in the hydrogenated conjugated diene copolymer after the hydrogenation to be described below is preferably 5% by mass or more in terms of the heat resistance and tensile strength of a target hydrogenated conjugated diene copolymer and preferably 40% by mass or less in terms of flexibility thereof. It is more preferably in the range of 10 to 30% by mass, more preferably in the range of 13 to 20% by mass.

The conjugated diene polymer obtained in the polymerization step as described above is also characterized in that the block percentage of the vinyl aromatic monomer block is high. This contributes to high mechanical strength of a target hydrogenated conjugated diene copolymer and high mechanical strength and high transparency of a polypropylene composition.

(Hydrogenation Step)

The conjugated diene copolymer obtained in the polymerization step as described above is hydrogenated to obtain a target hydrogenated conjugated diene copolymer.

The rate of hydrogenation is preferably as high as possible in terms of high productivity.

The method of hydrogenation includes a method of supplying hydrogen and hydrogenating an unsaturated group in the presence of a predetermined hydrogenation catalyst.

Examples of the hydrogenation catalyst include, but are not particularly limited to, (1) a so-called Ziegler-type hydrogenation catalyst using a transition metal salt such as an organic acid salt or an acetylacetone salt of Ni, Co, Fe, Cr, or the like and a reducing agent such as organoaluminum; and (2) a homogeneous hydrogenation catalyst such as a so-called organometallic complex such as an organometallic compound of Ti, Ru, Rh, Zr, or the like.

It is more preferable to use a titanocene catalyst as the hydrogenation catalyst in the hydrogenation step in terms of maintaining the high rate of hydrogenation and hydrogenation activity.

A more preferable hydrogenation catalyst includes a mixture of a titanocene compound and a reducing organometallic compound.

The titanocene compound and the hydrogenation method using the same are described in Japanese Patent Laid-Open No. 8-109219 or the like. Examples include a compound having at least one or more ligands having a (substituted) cyclopentadienyl skeleton, indenyl skeleton, or fluorenyl skeleton, such as bis(cyclopentadienyl)titanium dichloride and mono-pentamethylcyclopentadienyl titanium trichloride.

Further, examples of the reducing organometallic compound includes an organoalkali metal compound such as organolithium, an organomagnesium compound, an organoaluminum compound, an organoboron compound, and an organozinc compound.

The degree of hydrogenation of all the unsaturated group units contained in the conjugated diene monomer unit is preferably 75 mol % or more, more preferably 85 mol %, further preferably 90 mol %, and further more preferably 95 mol % or more, in terms of obtaining high mechanical strength, high aging resistance, and high UV resistance of a target hydrogenated conjugated diene copolymer.

The degree of hydrogenation of all the unsaturated group units contained in the conjugated diene monomer unit before hydrogenation can be measured by nuclear magnetic resonance spectroscopy (NMR).

A target hydrogenated conjugated diene copolymer is obtained by separating a solvent after the hydrogenation step as described above.

Examples of the method for separating a solvent include: a method of adding a polar solvent that works as a poor solvent to a copolymer such as acetone or alcohol to a solution after polymerization to precipitate the copolymer to recover a solvent; a method of charging a solution of a copolymer into hot water with stirring to remove and recover a solvent by steam stripping; a method of concentrating a solution of a copolymer in a flashing tank followed by devolatilization in a vent extruder or the like; and a method of directly heating a copolymer solution to distil off a solvent.

Various phenol stabilizers, phosphorus stabilizers, sulfur stabilizers, and amine stabilizers can be added to the recovered hydrogenated styrenic copolymer.

(Modification Step)

In the present embodiments, a modification step of introducing a functional group into a copolymer may be optionally performed after the (polymerization step) or (hydrogenation step) as described above.

Examples of the modification method include a method of adding a modifying agent which produces a functional group-containing atomic group to a living terminal of a conjugated diene copolymer or a hydrogenated conjugated diene copolymer.

Examples of the functional group-containing atomic group include, but are not limited to, atomic groups containing at least one functional group selected from a hydroxy group, a carbonyl group, a thiocarbonyl group, an acid halide group, an acid anhydride group, an ester group, a carboxyl group, a thiocarboxyl group, a thiocarboxylic ester group, a dithiocarboxylic ester group, a carboxylic amide group, a thiocarboxylic amide group, an aldehyde group, a thioaldehyde group, a carboxylate group, an amide group, a sulfonic acid group, a sulfonic ester group, a phosphoric acid group, a phosphoester group, a phosphite group, an amino group, an imino group, an ethyleneimino group, a nitrile group, a pyridyl group, a quinoline group, an epoxy group, a thioepoxy group, a sulfide group, an isocyanate group, a thioisocyanate group, a halogenated silyl group, a silanol group, an alkoxysilyl group, a halogenated tin group, an alkoxytin group, a phenyltin group, an epithio group, a halogen group, and the like, and preferably include an alkoxysilyl groups, an epoxy group, an amino group, an amide group, and an ester group.

[Hydrogenated Conjugated Diene Copolymer]

The hydrogenated conjugated diene copolymer obtained by the method for producing the hydrogenated conjugated diene copolymer of the present embodiments as described above preferably has a weight average molecular weight of 40,000 to 500,000, more preferably 50,000 to 400,000, and further preferably 70,000 to 300,000.

The hydrogenated conjugated diene copolymer obtained by the method for producing the hydrogenated conjugated diene copolymer of the present embodiments is characterized in that the molecular weight distribution (the ratio of the weight average molecular weight to the number average molecular weight) is narrow. Thereby, high mechanical strength is obtained in a hydrogenated conjugated diene copolymer and a polypropylene composition using the hydrogenated conjugated diene copolymer.

The molecular weight distribution of the hydrogenated conjugated diene copolymer obtained by the present embodiments is preferably 1.5 or less, more preferably 1.3 or less, further preferably 1.2 or less, further more preferably 1.1 or less, further more preferably 1.09 or less, and most preferably 1.07 or less.

The molecular weight and molecular weight distribution can be determined from the measurements by the gel permeation chromatography (GPC) shown in Examples to be described below.

EXAMPLES

Hereinafter, the present invention will be described in detail with reference to specific Examples and Comparative Examples, but the present invention is not limited to the following Examples.

[Preparation of Hydrogenation Catalyst]

The hydrogenation catalyst used in the hydrogenation reaction was prepared by the following method.

To a reaction vessel replaced with nitrogen was charged 1 liter of dried, purified cyclohexane, and thereto was added 100 mmol of bis($\eta$5-cyclopentadienyl)titanium dichloride. An n-hexane solution containing 200 mmol of trimethylaluminum was added to the mixture with sufficient stirring and allowed to react with each other at room temperature for about 3 days to obtain a hydrogenation catalyst.

[Polar Compound (a)]

Commercially available reagents were used for all of the compounds.

(1): 2,2-Bis(2-oxolanyl)propane
(2): Ethylene glycol dibutyl ether
(3): Ethyl ethylene glycol tert-butyl ether
(4): Tetrahydrofuran
(5): Tetramethylethylenediamine Note that (1) to (3) in the above polar compounds are each an ether compound having two or more oxygen atoms.

[Alkali Metal Alkoxide (B)]

Commercially available reagents were used for all of the compounds.

(I): Sodium t-pentoxide (cyclohexane solution)
(II): Potassium t-pentoxide (cyclohexane solution)

[Method for Producing Hydrogenated Conjugated Diene Copolymer]

Batch polymerization was performed using a vessel-type reactor having an internal volume of 10 L equipped with an agitating equipment and a jacket.

First, 1 L of cyclohexane was charged, and then thereto was added 0.06 part by mass of n-butyllithium relative to 100 parts by mass of all monomers. Then, to the mixture were added an ether compound (A) and an alkali metal alkoxide (B) in amounts as shown in the following Table 1.

As a first step, a cyclohexane solution containing 10 parts by mass of styrene (a concentration of 20% by mass) was charged over 10 minutes and then allowed to polymerize further for 10 minutes. The temperature was controlled at 65° C. during the polymerization.

Next, as a second step, a cyclohexane solution containing 80 parts by mass of butadiene (a concentration of 20% by mass) was charged over 100 minutes and then allowed to polymerize further for 15 minutes. The temperature was controlled at 65° C. during the polymerization.

Next, as a third step, a cyclohexane solution containing 10 parts by mass of styrene (a concentration of 20% by mass) was charged over 10 minutes and then allowed to polymerize further for 10 minutes. The temperature was controlled at 65° C. during the polymerization. Subsequently, methanol was added thereto.

Next, to the obtained polymer was added the hydrogenation catalyst prepared as described above in an amount of 150 ppm in terms of titanium per 100 parts by mass of the polymer, and the polymer was subjected to hydrogenation reaction at a hydrogen pressure of 0.7 MPa and a temperature of 70° C.

Subsequently, thereto was added methanol, and then was added 0.3 part by mass of octadecyl-3-(3,5-di-t-butyl-4-hydroxyphenyl)propionate as a stabilizer relative to 100 parts by mass of the polymer.

[Analysis and Evaluation Method of Hydrogenated Conjugated Diene Copolymer]

<(1) Measurement of Styrene Content in Hydrogenated Conjugated Diene Copolymer, Average Vinyl Bond Amount of Conjugated Diene Monomer Unit Before Hydrogenation, and Degree of Hydrogenation of Double Bond Based on the Conjugated Diene Monomer Unit>

The styrene content in the hydrogenated conjugated diene copolymer, the average vinyl bond amount of the conjugated diene monomer unit before hydrogenation, and the average degree of hydrogenation of the double bond based on the conjugated diene monomer unit were measured by nuclear magnetic resonance spectroscopy (NMR) under the following conditions.

Measuring equipment: JNM-LA400 (manufactured by JEOL Ltd.)
Solvent: Deuterated chloroform
Measuring sample: A sampled article before and after the hydrogenation of polymer
Sample concentration: 50 mg/mL
Observation frequency: 400 MHz
Chemical shift criterion: TMS (tetramethylsilane)
Pulse delay: 2.904 seconds
Number of times of scan: 64 times
Pulse width: 45°
Measurement temperature: 26° C.
(Evaluation Method)
(1-1) Vinyl Bond Amount The average vinyl bond amount of the conjugated diene before hydrogenation is preferably as high as possible, and an average vinyl bond amount of 70 mol % or more was rated as ○; an average vinyl bond amount of 65 mol % or more and less than 70 mol % was rated as Δ; and an average vinyl bond amount of less than 65 mol % was rated as X.

(1-2) Degree of Hydrogenation

The degree of hydrogenation of the double bond of conjugated diene was measured when it was hydrogenated at 70° C. for 15 minutes under the conditions described in the method for producing the hydrogenated conjugated diene copolymer as described above.

In terms of achieving high productivity, the rate of hydrogenation is preferably as high as possible, and 98% or more was rated as good (○); and less than 98% was rated as poor (X).

<(2) Measurement of Weight Average Molecular Weight, Number Average Molecular Weight, and Molecular Weight Distribution of Hydrogenated Conjugated Diene Copolymer>

The weight average molecular weight, the number average molecular weight, and the molecular weight distribution (Mw/Mn) of hydrogenated conjugated diene copolymer were measured by gel permeation chromatography (GPC) under the following conditions.

The molecular weight distribution was determined from the ratio of the weight average molecular weight to the number average molecular weight obtained.
Measurement device: LC-10 (manufactured by Shimadzu Corporation)
Column: TSKgelGMHXL (4.6 mm ID×30 cm), 2 pieces
Solvent: Tetrahydrofuran
Sample for calibration curves: Commercially available standard polystyrene (manufactured by TOSOH CORPORATION), ten-point measurement
(Evaluation Method)
(2-1) Molecular Weight Distribution The molecular weight distribution is preferably as small as possible in terms of achieving high tensile strength of a hydrogenated conjugated diene copolymer by itself or a composition of the hydrogenated conjugated diene copolymer and polypropylene, and a molecular weight distribution of 1.2 or less was rated as ○; and a molecular weight distribution exceeding 1.2 was rated as X.

Examples 1 to 7, Comparative Examples 1 to 4

The hydrogenated conjugated diene copolymers were each prepared using a predetermined amount of polar compound (A) and alkali metal alkoxide (B) as shown in the following Table 1, and each of the copolymers was evaluated. Evaluation results are shown in the following Table 1.

TABLE 1

| | Conditions | | | | | Results | | | |
|---|---|---|---|---|---|---|---|---|---|
| | Polar compound (A) | | Alkali metal alkoxide (B) | | | Vinyl bond amount | | Molecular weight distribution | Degree of hydrogenation |
| | Compound | (mol/Organo-Li compound) | Compound | (mol/Organo-Li compound) | (B)/(A) (—) | (mol % in Bd) | Rating | (Mw/Mn) (—) | Rating | Rating |
| Example 1 | (1) | 1.7 | (I) | 0.050 | 0.029 | 73 | ○ | 1.08 | ○ | ○ |
| Example 2 | (2) | 1.7 | (I) | 0.050 | 0.029 | 72 | ○ | 1.08 | ○ | ○ |
| Example 3 | (3) | 1.7 | (I) | 0.050 | 0.029 | 69 | Δ | 1.12 | ○ | ○ |
| Example 4 | (1) | 1.7 | (I) | 0.130 | 0.076 | 74 | ○ | 1.11 | ○ | ○ |
| Example 5 | (1) | 1.7 | (I) | 0.150 | 0.088 | 75 | ○ | 1.13 | ○ | ○ |
| Example 6 | (1) | 2.4 | (I) | 0.050 | 0.021 | 75 | ○ | 1.15 | ○ | ○ |
| Example 7 | (1) | 2.4 | (I) | 0.015 | 0.006 | 67 | Δ | 1.09 | ○ | ○ |
| Example 8 | (2) | 1.7 | (II) | 0.050 | 0.029 | 70 | ○ | 1.09 | ○ | ○ |
| Comparative Example 1 | (1) | 1.7 | (I) | 0.330 | 0.194 | 76 | ○ | 1.40 | X | X |
| Comparative Example 2 | (1) | 3.5 | (I) | 0.330 | 0.094 | 75 | ○ | 1.43 | X | X |
| Comparative Example 3 | (4) | 1.7 | (I) | 0.050 | 0.029 | 25 | X | 1.20 | ○ | ○ |
| Comparative Example 4 | (5) | 1.7 | (I) | 0.050 | 0.029 | 73 | ○ | 1.13 | ○ | X |
| Comparative Example 5 | (1) | 2.4 | (I) | 0.005 | 0.002 | 63 | X | 1.08 | ○ | ○ |

In the above Table 1, the polar compound (A) represents the following compounds (1) to (5).
(1): 2,2-Bis(2-oxolanyl)propane
(2): Ethylene glycol dibutyl ether
(3): Ethyl ethylene glycol tert-butyl ether
(4): Tetrahydrofuran
(5): Tetramethylethylenediamine
In the above Table 1, the alkali metal alkoxide (B) represents the following compounds (I) and (II).
(I): Sodium t-pentoxide (cyclohexane solution)
(II): Potassium t-pentoxide (cyclohexane solution)
The symbol in the above Table 1 represents the following compound.

Bd: Butadiene

It has been able to produce a hydrogenated conjugated diene copolymer having a high vinyl bond amount of a conjugated diene block moiety and a narrow molecular weight distribution at a high rate of hydrogenation while achieving high productivity, by allowing an organolithium compound, an ether compound (A) having two or more oxygen atoms, and an alkali metal alkoxide (B) to be present together in a polymerization step in the following molar ratios:

(A)/organolithium compound is 0.2 or more and less than 3.0; and (B)/organolithium compound is 0.01 or more and 0.3 or less.

The present application is based on Japanese Patent Application No. 2011-119647 filed to the Japanese Patent Office on May 27, 2011, the contents of which are incorporated herein by reference.

INDUSTRIAL APPLICABILITY

The hydrogenated conjugated diene copolymer obtained by the method for producing the hydrogenated conjugated diene copolymer of the present invention has industrial applicability in the fields of footwear, plastic modifiers, adhesives, and the like, and as packaging materials for home products, household appliances and industrial components, and the like, medical materials, tubing, toy materials, and the like.

The invention claimed is:

1. A method of producing a hydrogenated conjugated diene copolymer comprising:

a polymerization step of copolymerizing butadiene monomers and vinyl aromatic monomers using an initiator comprising an organolithium compound; and a hydrogenation step of hydrogenating the conjugated diene copolymer obtained in the polymerization step, wherein in the polymerization step, the organolithium compound, an ether compound (A) having two or more oxygen atoms, and an alkali metal alkoxide (B) are present together in the following molar ratios:

ether compound (A)/organolithium compound ((A)/organolithium compound) is 1.7 or more and 2.4 or less;

alkali metal alkoxide (B)/organolithium compound ((B)/organolithium compound) is 0.015 or more and 0.150 or less, alkali metal alkoxide (B)/ether compound (A) ((B)/(A)) is 0.006 or more and 0.076 or less, the ether compound (A) is selected from the group consisting of 2,2-diethoxypropane, 1,2-diethoxypropane, ethylene glycol dibutyl ether ethylene glycol dimethyl ether, ethylene glycol diethyl ether, diethylene glycol dimethyl ether, diethylene glycol diethyl ether, ethyl ethylene glycol t-butyl ether, ethyl ethylene glycol butyl ether, triethylene glycol dimethyl ether, bis(2-oxolanyl)ethane, 2,2-bis(2-oxolanyl)propane, 1,1-bis(2-oxolanyl)ethane, 2,2-bis(2-oxolanyl)butane, 2,2-bis(5-methyl-2-oxolanyl)propane, and 2,2-bis(3,4,5-trimethyl-2-oxolanyl)propane, the alkali metal alkoxide (B) is sodium, lithium or potassium alkoxide having an alkyl group having 2 to 12 carbon atoms, and the vinyl aromatic monomers comprise styrene, α-methylstyrene, p-methylstyrene, vinylethylbenzene, and/or 2-vinylnaphthalene.

2. The method according to claim 1, wherein the molar ratio of (B)/(A) is 0.015 or more and 0.08 or less.

3. The method according to claim 1 or 2, wherein the ether compound (A) having two or more oxygen atoms is ethylene glycol dibutyl ether, ethyl ethylene glycol t-butyl ether, or 2,2-bis(2-oxolanyl)propane.

4. The method according to claim 1 or 2, wherein an alkali metal of the alkali metal alkoxide (B) is sodium or potassium.

5. The method according to claim 1 or 2, wherein in the hydrogenation step, a titanocene compound is used as a hydrogenation catalyst.

6. The method according to claim 1 or 2, wherein the molar ratio of (A)/organolithium compound is 1.7 or more and 2.0 or less.

7. The method according to claim 1, wherein in the molar ratio of (B)/(A) is 0.025 or more and 0.08 or less.

8. The method according to claim 1 or 2, wherein the ether compound (A) having two or more oxygen atoms is ethylene glycol dibutyl ether, ethyl ethylene glycol t-butyl ether, or 2,2-bis(2-oxolanyl)propane;

an alkali metal of the alkali metal alkoxide (B) is sodium or potassium; and in the hydrogenation step, a titanocene compound is used as a hydrogenation catalyst.

9. The method according to claim 1 or 2, wherein the ether compound (A) is selected from the group consisting of bis(2-oxolanyl)ethane, 2,2-bis(2-oxolanyl)propane, 1,1-bis(2-oxolanyl)ethane, 2,2-bis(2-oxolanyl)butane, 2,2-bis(5-methyl-2-oxolanyl)propane, and 2,2-bis(3,4,5-trimethyl-2-oxolanyl)propane.

10. The method according to claim 5, wherein the titanocene compound comprises at least one or more ligands having an optionally substituted cyclopentadienyl skeleton, indenyl skeleton, or fluorenyl skeleton.

11. The method according to claim 5, wherein the titanocene compound comprises bis(cyclopentadienyl)titanium dichloride, or mono-pentamethylcyclopentadienyl titanium trichloride.

* * * * *